E. CANTONO.
AUTOMATIC STARTING DEVICE FOR EXPLOSION MOTORS, &c.
APPLICATION FILED JUNE 22, 1907.
944,316.
Patented Dec. 28, 1909.
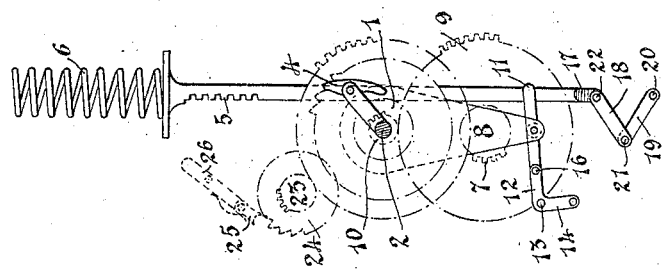
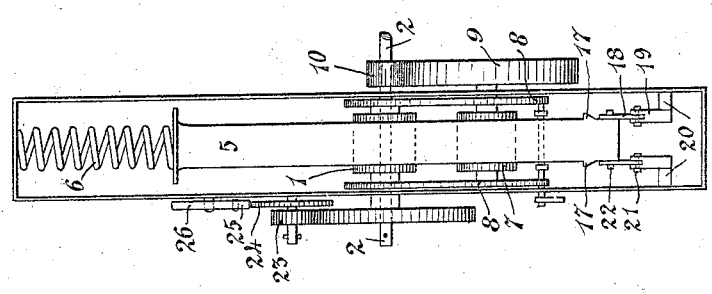
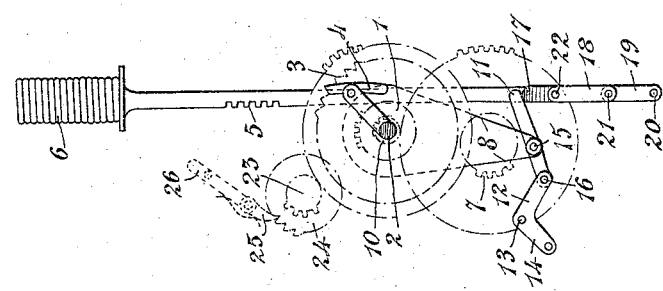
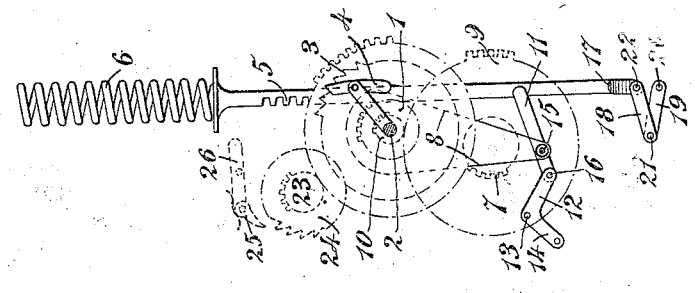
Witnesses:
S. Nieuman
AB Mattingly
Inventor:
Eugenio Cantono,
By his Attorney,
F. H. Richards.

UNITED STATES PATENT OFFICE.

EUGENIO CANTONO, OF ROME, ITALY, ASSIGNOR TO THE FIRM OF SOCIETÀ ANONIMA DI COSTRUZIONI MECCANICHE FRENI A RICUPERO CANTONO, OF GENOA, ITALY.

AUTOMATIC STARTING DEVICE FOR EXPLOSION-MOTORS, &c.

944,316.  Specification of Letters Patent.  Patented Dec. 28, 1909.

Application filed June 22, 1907. Serial No. 380,208.

*To all whom it may concern:*

Be it known that I, EUGENIO CANTONO, a subject of the King of Italy, residing at Rome, Italy, have invented new and useful improvements in automatic starting devices for explosion-motors and generally for shafts rotating in one direction, of which the following is a specification.

The object of this invention is to provide an automatic starting device for motors of motor vehicles.

In the drawings, Figure 1 shows diagrammatically in side elevation a form of the invention. Fig. 2 shows the same parts in different positions. Fig. 3 is a front elevation of the device and Fig. 4 is a view similar to Fig. 1 with the parts in still another position.

The new starting device is illustrated in Figs. 1, 2, 3 and 4 of the annexed drawings, where 1 is a pinion capable of rotating on the driving shaft 2. A gear wheel 3 is fixed on the said pinion 1 and engaged by pawl or pawls 4 carried by the driving shaft 2. The said pinion meshes with a rack 5 controlled by spring 6 so as to be capable under the action of the said spring to cause a movement of pinion 1, and by ratchet wheel 3 the movement of the driving shaft 2.

The rack 5 may mesh with another pinion 7 keyed on a shaft carried by supports 8 movable around the axis of the driving shaft 2 and the pinion 1. On the same shaft of pinion 7 another wheel 9 is keyed which owing to the fact of the supports turning about the axis of shaft 2, always gears with a small pinion 10 carried by the driving shaft 2 which through the said pinion 10 and wheel 9 and pinion 7 (solidary with wheel 9) is capable of operating rack 5 and compressing spring 6. To push supports 8 and lock them in exact position in order that pinion 7 may gear with rack 5, two small arms 11, 12, hinged together, have been provided, the one being carried by supports 8 and the other being capable of oscillating about a fixed point 13. The latter is operated by a small lever 14 which causing alinement of the three points 15, 16 and 13 and consequent rigidity and opposition of arms 11 and 12, will immobilize the supports 8 in the position necessary to cause pinion 7 to place spring 6 under compression through the medium of rack 5 (Fig. 4).

The rack near its end opposed to the spring has on both sides an extension or protruding tooth 17 which abutting against one end of arm 11 breaks in proper time the alinement 15, 16, 13 so that pinion 7 moving away from rack 5 arrests compression of spring 6. In order to then keep rack 5 in compressed position (Fig. 2) its end opposed to spring 6 has also on its axis a small movable arm 18 hinged to another arm 19 oscillating about a fixed point 20 exactly in line with the axis of the rack and forming a pair of links 18, 19 which by opening under traction of rack 5 form an alinement 22, 21, 20, (Fig. 2) opposing its release.

To allow the apparatus to be charged by hand without effort the outer rim of ratchet wheel 3 has teeth meshing with a small pinion 23 carried by a secondary shaft capable of being operated by a crank. This same pinion 23 may also keep the rack under compression of the links 18, 19. To this purpose it also may be provided with a ratchet wheel 24 fixed with it and the pawl of which is formed of two small arms 25, 26 hinged together the one of which engages with wheel 24 and the other swings about a fixed point so that by breaking the alinement they form, when arm 25 of pawl acts, the pawl may be removed and the wheel left perfectly free.

The operation of the above described starting device is as follows: The driving shaft 2 (Figs. 1, 2, 3 and 4) being in motion, in order to charge the apparatus, pinion 7 through movement of lever 14 and operating arm 12, is caused to gear with rack 5 which compresses spring 6 until extensions 17 by breaking the alinement 15, 16, 13 will arrest rack 5 which is kept immobilized by links 18, 19. By then breaking the said second alinement 22, 21, 20 the rack starts and by rotating through pinion 1 and ratchet wheel 3 the driving shaft 2 (which is now considered to be at rest) starts the motor.

Having now fully described my said invention and the manner in which the same is to be performed, what I claim and desire to secure by Letters Patent of the United States is:—

1. An automatic starting device comprising a frame carrying an endwise movable rack bar, a spring between the frame and one end of the rack bar arranged to be compressed by endwise movement of the rack, a driving shaft, a pinion loose on the driving shaft and meshing with said rack, a ratchet wheel secured to said pinion, a pawl carried by the shaft and engaging the ratchet wheel whereby the endwise movement of the rack bar on expansion of the spring will through the pawl and ratchet wheel rotate the shaft in one direction, a second gear wheel rotated from said shaft, a support for the second gear wheel mounted to swing on the axis of the shaft whereby the gear can be shifted to engage the rack bar, means for shifting the member supporting said second gear to cause it to engage the rack and thereby cause endwise movement of the rack to compress the spring, means for retaining the rack with the spring compressed, and means for shifting said swinging member out of engagement with the rack when the said spring becomes compressed.

2. An automatic starting device comprising a frame carrying an endwise movable rack bar, a spring between the frame and one end of the rack bar arranged to be compressed by endwise movement of the rack, a driving shaft, a pinion loose on the driving shaft and meshing with said rack, a ratchet wheel secured to said pinion, a pawl carried by the shaft and engaging the ratchet wheel whereby the endwise movement of the rack bar on expansion of the spring will through the pawl and ratchet wheel rotate the shaft in one direction, a second gear wheel, a support for the second gear wheel mounted to swing on the axis of the shaft whereby the gear can be shifted to engage the rack bar, a large gear carried by said second gear, a pinion fast on said shaft and engaging said large gear, means for shifting the support for said gear to bring it to engage the rack and thereby cause endwise movement of the rack to compress the spring, means for retaining the rack with the spring compressed, and means for shifting said swinging member out of engagement with the rack when the said spring becomes compressed.

3. An automatic starting device comprising a frame carrying an endwise movable rack bar, a spring between the frame and one end of the rack bar arranged to be compressed by endwise movement of the rack, a driving shaft, a pinion loose on the driving shaft and meshing with said rack, a ratchet wheel secured to said pinion, a pawl carried by the shaft and engaging the ratchet wheel whereby the endwise movement of the rack bar on expansion of the spring will through the pawl and ratchet wheel rotate the shaft in one direction, a second gear wheel rotated from said shaft, a support for the second gear wheel mounted to swing on the axis of the shaft whereby the gear can be shifted to engage the rack bar, means for shifting said swinging member out of engagement with the rack when the said spring becomes compressed, a pair of links connecting with the swinging member carrying said gear and arranged to swing the gear to engage the rack bar when the links are brought into alinement and retain it in such position, means for swinging said links out of alinement upon the spring becoming compressed, and means for retaining the rack with the spring compressed.

4. An automatic starting device comprising a frame carrying an endwise movable rack bar, a spring between the frame and one end of the rack bar arranged to be compressed by endwise movement of the rack, a driving shaft, a pinion loose on the driving shaft and meshing with said rack, a ratchet wheel secured to said pinion, a pawl carried by the shaft and engaging the ratchet wheel whereby the endwise movement of the rack bar on expansion of the spring will through the pawl and ratchet wheel rotate the shaft in one direction, a second gear wheel rotated from said shaft, a support for the second gear wheel mounted to swing on the axis of the shaft whereby the gear can be shifted to engage the rack bar, a pair of links connecting with the swinging member carrying said gear and arranged to swing the gear to engage the rack bar when the links are brought into alinement, means for swinging said links out of alinement upon the spring becoming compressed, and a pair of links connected with the rack bar arranged to be brought into alinement upon the end of the movement compressing the spring to hold the spring under compression.

5. An automatic starting device comprising a frame carrying an endwise movable rack bar, a spring between the frame and one end of the rack bar arranged to be compressed by endwise movement of the rack, a driving shaft, a pinion loose on the driving shaft and meshing with said rack, a ratchet wheel secured to said pinion, a pawl carried by the shaft and engaging the ratchet wheel whereby the endwise movement of the rack bar on expansion of the spring will through the pawl and ratchet wheel rotate the shaft in one direction, a second gear wheel rotated from said shaft, a support for the second gear wheel mounted to swing on the axis of the shaft whereby the gear can be shifted to engage the rack bar, a pair of links connecting with the swinging member carrying said gear and arranged to swing the gear to engage the rack bar when the links are brought into alinement, a lug on the rack bar engaging the links to swing said links out of alinement upon the spring becoming compressed, and a pair of links connected with the rack bar arranged to be brought into alinement upon the end of the movement compressing the spring to hold the spring under compression.

6. An automatic starting device comprising a frame carrying an endwise movable rack bar, a spring between the frame and one end of the rack bar arranged to be compressed by endwise movement of the rack, a driving shaft, a pinion loose on the driving shaft and meshing with said rack, a ratchet wheel secured to said pinion, a pawl carried by the shaft and engaging the ratchet wheel whereby the endwise movement of the rack bar on expansion of the spring will through the pawl and ratchet wheel rotate the shaft in one direction, a second gear wheel, a support for the second gear wheel mounted to swing on the axis of the shaft whereby the gear can be shifted to engage the rack bar, a large gear carried by said gear, a pinion fast on said shaft and engaging said large gear, means for shifting the support for said gear to bring the gear to engage the rack and thereby cause endwise movement of the rack and compress the spring, a pair of links connecting with the swinging member carrying said gear and arranged to swing the gear to engage the rack bar when the links are brought into alinement, a lug on the rack bar engaging the links to swing said links out of alinement upon the springs becoming compressed, and a pair of links connected with the rack bar arranged to be brought into alinement upon the end of the movement compressing the spring to hold the spring under compression.

In testimony whereof I have signed my name to this specification in the presence of two subscribing witnesses.

EUGENIO CANTONO.

Witnesses:
G. BIZZARRI,
DUILIO NARDONI.